United States Patent
Furukawa et al.

(10) Patent No.: US 6,414,985 B1
(45) Date of Patent: Jul. 2, 2002

(54) METHOD FOR DETERMINING REFERENCE PHASE IN RADIO COMMUNICATION SYSTEM WHICH USES ORTHOGONAL M-ARY MODULATION, AND COHERENT DETECTION METHOD USING THE SAME

(75) Inventors: Hideto Furukawa; Makoto Yoshida; Nami Hatazoe, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/152,022

(22) Filed: Sep. 11, 1998

(30) Foreign Application Priority Data

Sep. 12, 1997 (JP) .............................................. 9-249210

(51) Int. Cl.$^7$ .............................................. H04B 7/216
(52) U.S. Cl. ...................................... 375/142; 370/335
(58) Field of Search ................................ 370/203, 204, 370/205, 206, 208, 215, 320, 335, 342, 441; 375/142, 143, 150, 152

(56) References Cited

U.S. PATENT DOCUMENTS

| 5,136,612 A | * | 8/1992 | Bi .............................. 370/342 |
| 5,734,647 A | * | 3/1998 | Yoshida et al. ............. 370/335 |
| 5,920,228 A | * | 7/1999 | Soga et al. .................. 329/304 |

FOREIGN PATENT DOCUMENTS

JP   8-288927   1/1996

OTHER PUBLICATIONS

Performace Evaluation of DS–CDMA System with M–ary Orthogonal Signaling, E. Hong, et al., IEEE 1996 vol. 45, No. 1. pp. 57–63.

Iterative Decoding and Despreading improves CDMA–System using M–ary Orthogonal Modulation and FEC, R. Herzog et al., IEEE 1997, pp. 903–913.

\* cited by examiner

Primary Examiner—Wellington Chin
Assistant Examiner—Brenda Pham
(74) Attorney, Agent, or Firm—Katten Muchin Zavis Rosenman

(57) ABSTRACT

Reference phase is a radio communication system using orthogonal M-ary modulation is determined, so that a coherent detection system for a CDMA radio communication system is readily achieved. The determination of reference phase is performed by the step of determining a reference phase in a radio communication system, which uses orthogonal M-ary codes comprising the steps of determining the correlation values of an in-phase component and quadrature component corresponding to respective Hadamard matrices resulting from fast Hadamard transform or inverse Hadamard transform of a signal, which possesses said in-phase component and quadrature component, and which is sent from the sending end by phase shift keying an orthogonal M-ary code computing the sum of the squares of the respective correlation values of said in-phase component and quadrature component and selecting either said fast Hadamard transform or inverse Hadamard transform output, which outputs a maximum value of said computed sum of the squares.

11 Claims, 20 Drawing Sheets

COMPARING ERROR CHARACTERISTICS WHEN
THERE IS NO FADING

COMPARING ERROR CHARACTERISTICS WHEN THERE IS FADING

METHOD FOR DETERMINING REFERENCE PHASE IN RADIO COMMUNICATION SYSTEM WHICH USES ORTHOGONAL M-ARY MODULATION, AND COHERENT DETECTION METHOD USING THE SAME

BACKGROUND OF THE INVENTION

1. Field of the Invention

The present invention relates to a method for determining the reference phase in a radio communication system that uses orthogonal M-ary modulation, and a coherent detection method that uses the same.

2. Description of the Related Art

Code division multiple access (CDMA) systems are gaining attention as next-generation mobile communication systems, and a standard system, called IS-95, already exists in the United States. As means of infrastructure building, CDMA systems based on a semi-fixed mobile communication system called a wireless local loop (WLL) could also be put to use.

This is a CDMA system with a chip rate of 1.2288 Mcps proposed by Qualcomm, Inc. of the United States, the downlink of which uses a coherent detection system, which utilizes a pilot extrapolation signal. Conversely, the uplink uses an non-coherent detection system, which utilizes orthogonal M-ary modulation.

As for the non-coherent detection system, which uses orthogonal M-ary modulation in the uplink in this IS-95 standard system, by converting the amplitude signal to power at the receiving end, phase errors caused by fading and the like are removed to prevent degradation. However, error rate characteristics deteriorate more during non-coherent detection than during coherent detection.

SUMMARY OF THE INVENTION

Therefore, an object of the present invention is to provide a method for determining the received reference phase of an orthogonal M-ary modulated radio communication system, and a demodulation method that uses the same, so as to enable the enhancement of the performance of the uplink in an IS-95 standard system.

A further object of the present invention is to provide a coherent detection system for orthogonal M-ary modulated CDMA radio communications with broader applications. Another object of the present invention is to provide a method that makes it possible to determine the received reference phase at the receiving end when performing orthogonal M-ary modulation for orthogonal coding as a general application.

Other objects of the present invention are clarified in the description of the embodiments of the present invention below.

A method for determining the reference phase of a radio communication system, which achieves the above-cited tasks of the present invention, is based on determining the correlation values of an in-phase component and quadrature component corresponding to respective Hadamard matrices resulting from fast Hadamard transform or inverse Hadamard transform of a signal, which possesses this in-phase component and quadrature component, and which is sent from the sending end by phase shift keying an orthogonal M-ary code; computing the sum of the squares of the respective correlation values of this in-phase component and quadrature component; and selecting either the fast Hadamard transform or inverse Hadamard transform output, which outputs a maximum value of the computed sum of the squares.

Such a radio communication system uses a reference phase determination method, and comprises a plurality of base stations and a plurality of terminals.

A demodulation method of a radio communication system, in which a plurality of base stations and terminals are connected via spread spectrum communications, and which uses a code division multiple access system, which performs orthogonal M-ary modulation on a data signal, followed by spread modulation, determines an in-phase component and an quadrature component by de-spreading a reception signal, and determines the correlation values of this in-phase component and quadrature component, which correspond to respective Hadamard matrices resulting from either a fast Hadamard transform or an inverse Hadamard transform performed on this in-phase component and quadrature component. Further, the orthogonal M-ary modulated radio communication system and the base stations utilized therein are characterized in computing the sum of the squares of the respective correlation values of the in-phase component and quadrature component; selecting either a fast Hadamard transform or inverse Hadamard transform output, which outputs the maximum value of the computed sum of the squares; carrying out coherent detection by performing complex multiplication of the selected fast Hadamard transform or inverse Hadamard transform output and the in-phase component and quadrature component determined by this de-spreading; determining the correlation value by the fast Hadamard transform or inverse Hadamard transform of the coherent detection output; and converting an Hadamard matrix, which corresponds to the maximum value of the determined correlation value, to a data signal.

The orthogonal M-ary modulated radio communication system and the base stations are further characterized in utilizing a moving average filter to equalize this fast Hadamard transform or inverse Hadamard transform output, which outputs the maximum value of the computed sum of the squares described above.

The orthogonal M-ary modulated radio communication system and the base stations are also characterized in utilizing a primary linear interpolation filter to equalize a fast Hadamard transform or inverse Hadamard transform output, which outputs the maximum value of the computed sum of the squares described above.

The orthogonal M-ary modulated radio communication system and the base stations are also are characterized in that primary linear interpolation is also performed on the output of the above-cited moving average filter in the above-described.

DESCRIPTION OF THE PREFERRED EMBODIMENTS

Embodiments of the present invention are explained below by referring to the figures. Further, those parts in the figures which are identical or similar are explained by assigning them the same reference numbers or reference symbols.

Figure 16:
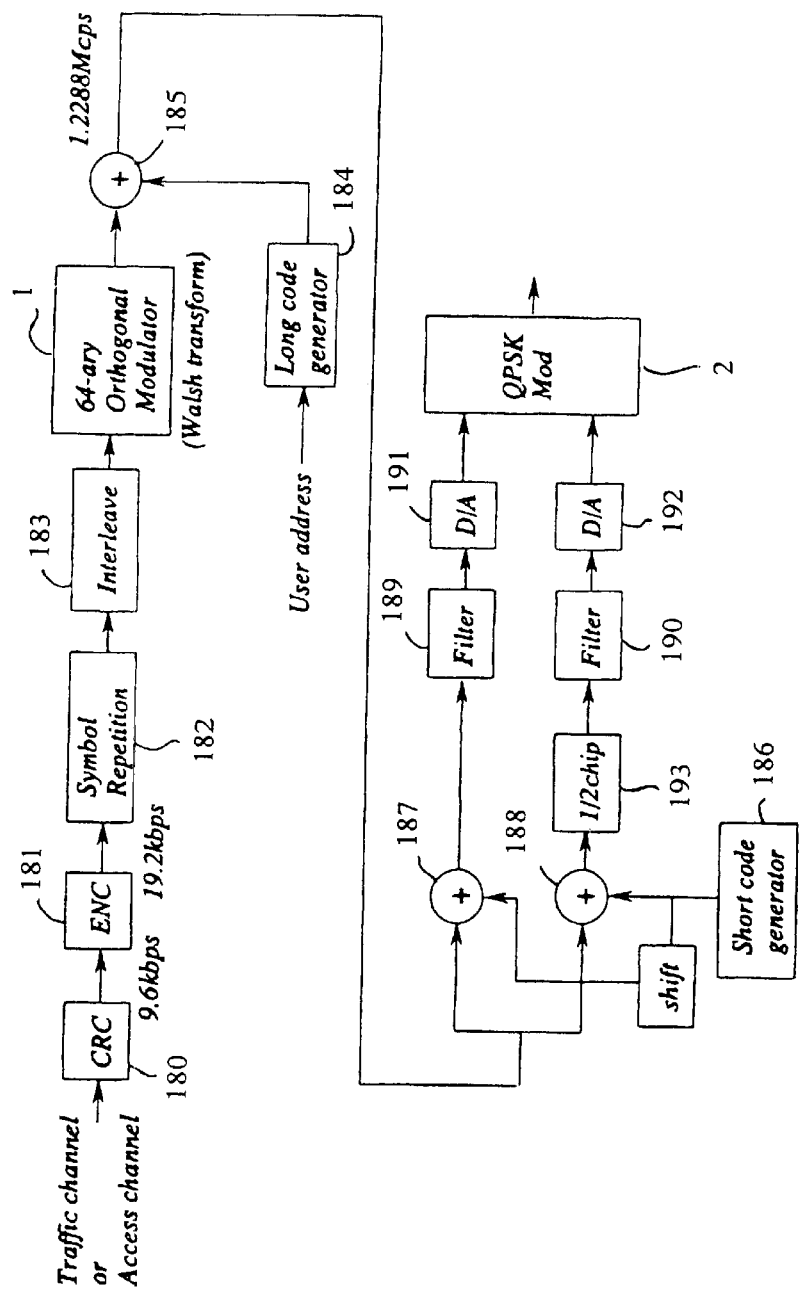
FIG. 16 is a block diagram of a fundamental configuration of the sending of the IS-95 standard system.

Here, prior to explaining the embodiments of the present invention, an explanation of an IS-95 standard system is provided for an accurate understanding of the present invention. FIG. 16 depicts a block diagram of a fundamental configuration of the sending end of this IS-95 standard system. This block diagram depicts the means for sending an uplink signal, which, in mobile communications, is the signal sent from a user to a base station.

To enhance error correction capabilities on the receiving end, a data signal (for example, 9.6 kbps) is cyclically encoded (cyclic redundancy check (CRC)) by an encoder 180, and then, this encoded data signal is transformed by a convolutional coding circuit 181 into a convolutional code with an appended error correction code.

Further, so as to enable a plurality of signals from 1.2 kbps to 9.6 kbps to be processed, a circuit 182 repetitively processes the same symbol, carrying out processing which standardizes signals of differing velocities from 1.2 kbps to 9.6 kbps at a 9.6 kbps signal velocity.

Next, after undergoing buffering the output from the circuit 182 in random access memory (RAM) 183, the buffering signals are read out or interleaved so as to form a 28.8 kbps signal sequence, and inputted to an orthogonal M(64)-ary modulator 1. Here, as indicated by the signal sequence depicted in FIGS. 17A to 17E, a 9.6 kbps data signal A comprising 192 bits per frame is transformed into a 28.8 kbps convolutional coded signal B comprising 576 bits per frame.

This convolutional coded signal B undergoes Hadamard transform in an orthogonal 64-ary modulator 1, and a 6-bit data signal is transformed into 64-chip orthogonal codes (Hadamard matrix) C. That is, the 6-bit data signal is spread 64/6-times, to form a 307.2 kcps signal D.

Referring once again to FIG. 16, this spread signal D is multiplied by a multiplier 185 with a code generator 184— generated ($2^{42}-1$) pseudo noise (PN) code (long code) for identifying each user. This results in a 1.2288 Mcps spread code sequence E.

Next, a ($2^{15}-1$) PN code (short code) 186 for identifying base stations is multiplied by this spread signal via multipliers 187, 188 for the I channel (Ich) and Q channel (Qch). The respective outputs of multipliers 187, 188 are propagated through filters 189, 190, and converted to analog signals by digital-to-analog (D/A) converters 191, 192. Analog signals from D/A converters 191, 192 are then inputted to a quadrature phase shift keying (QPSK) modulator 2.

Here, since the Ich and Qch signals are shifted ½ chip by a ½ chip delay circuit 193, the output of the QPSK modulator 2 becomes an offset QPSK (hereafter referred to as OQPSK) modulated signal. Since this OQPSK modulation does not result in a phase shift of $\pi$, but rather brings about a phase change of a maximum of $\pi/2$, even under severe bandwidth limitations, the signal envelope only collapses slightly, but does not result in zero.

The OQPSK-modulated signal generated as described above is transformed to a radio frequency by a circuit not depicted in the figure, and sent to a base station.

Figure 18A:
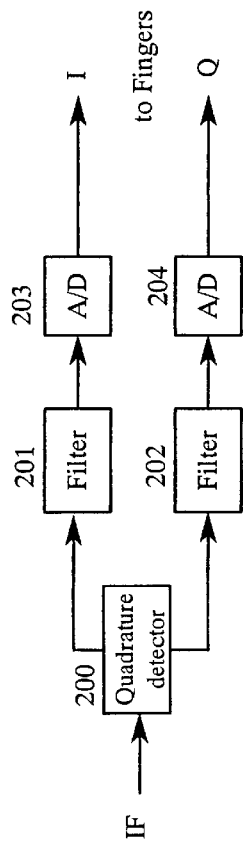
FIGS. 18A and 18B are block diagrams showing receiving means of an uplink that corresponds to the sending means depicted in FIG. 16.
Figure 18B:
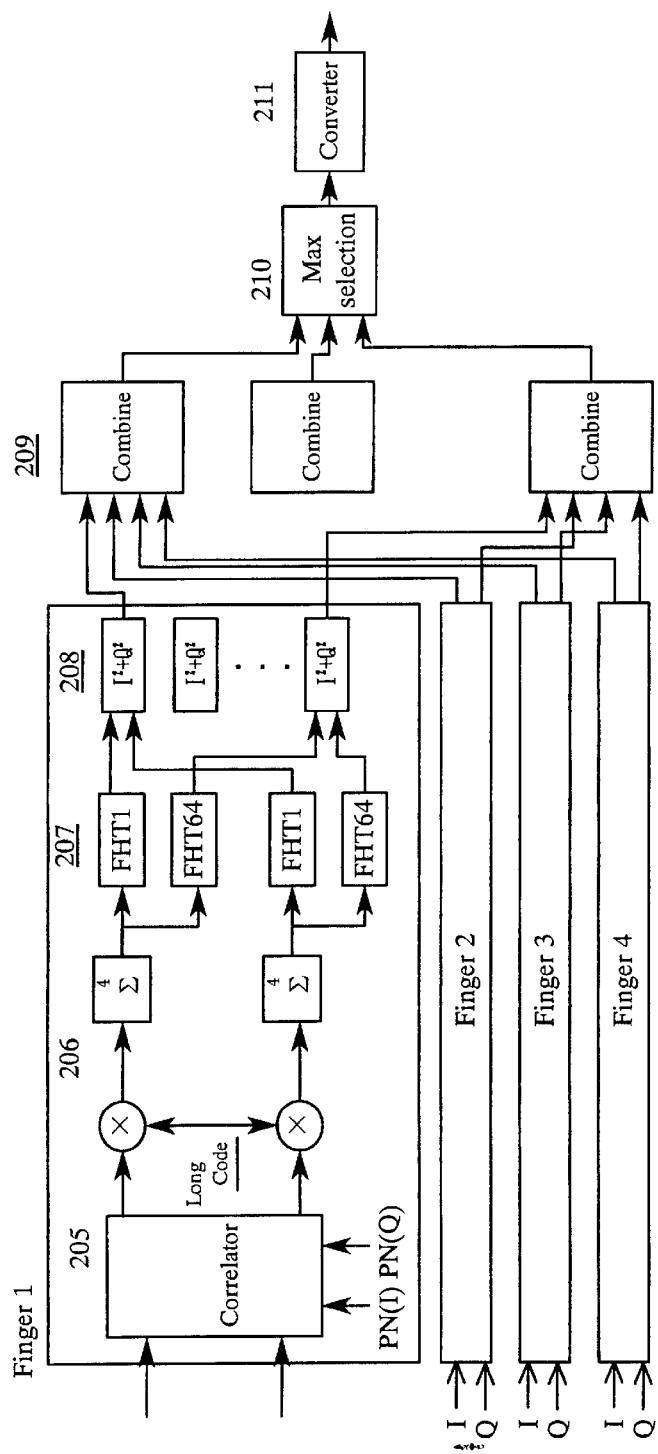

Next, FIGS. 18A, 18B depict block diagrams showing receiving means of an uplink that corresponds to the sending means depicted in FIG. 16. FIGS. 19A to 19D are signal sequence diagrams for the receiving means. The radio signal sent from the sending end is converted by a circuit not depicted in the figure to an intermediate frequency (IF) signal. As depicted in FIG. 18A, the IF signal is separated into Ich and Qch signals by a quadrature detector 200, and the Ich and Qch signals are respectively propagated through filters 201, 202, and then converted to digital signals by analog-to-digital (A/D) converters 203, 204.

When a RAKE receiving system is utilized, these Ich and Qch signals, which have been converted to digital signals, are inputted in common to a plurality of fingers 1–4. The configuration of these fingers 1–4 are identical, and in each, the Ich and Qch signals are de-spread by multiplying them in a correlator 205 with the PN code of the short code for the base station. They are de-spread further by multiplying them in a multiplier 206 with the long code of the pertinent user.

Figures 17A, 17B, 17C, 17D, 17E:
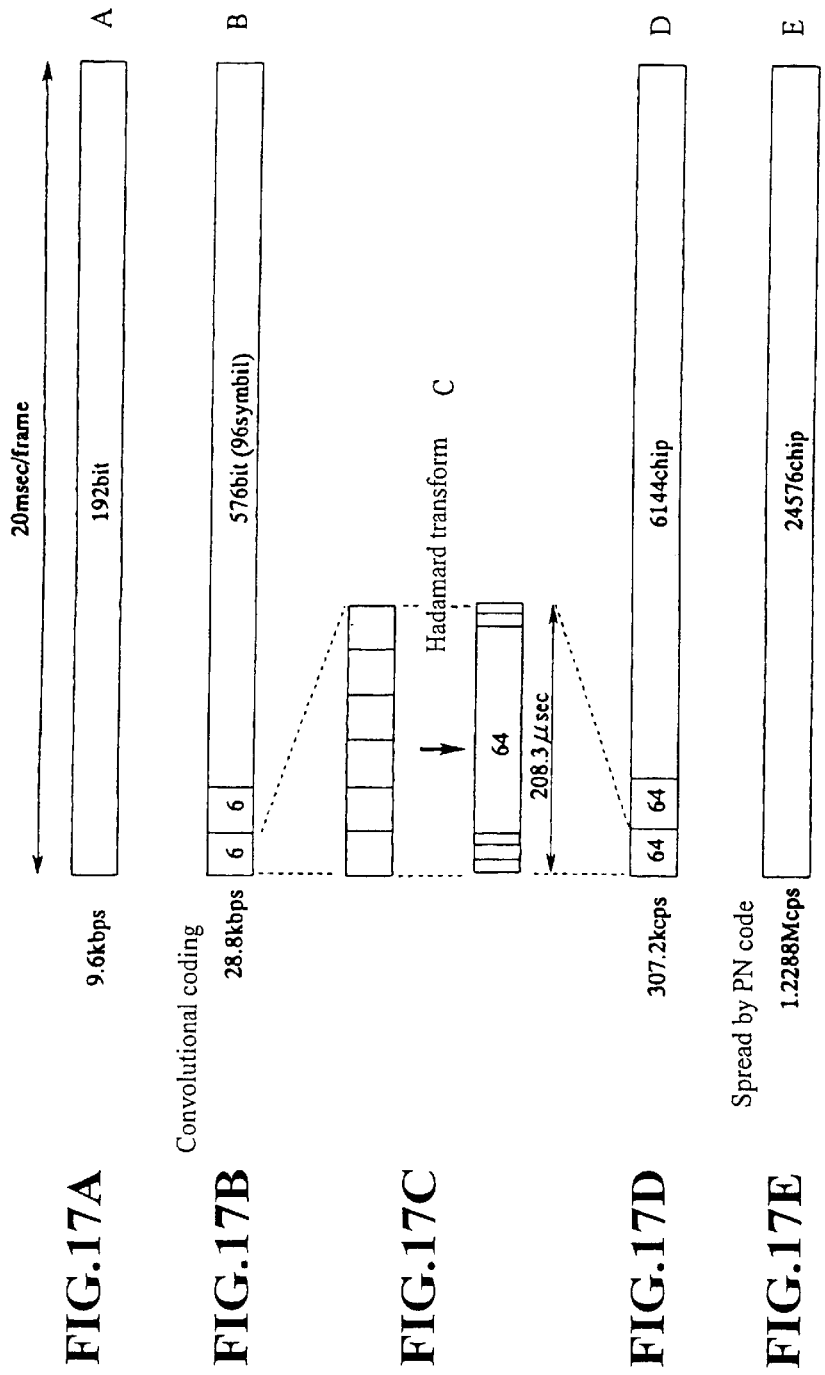
FIGS. 17A to 17E are signal sequence diagram for sending means in FIG. 16.

A signal that has been de-spread in this way (FIG. 19A) corresponds to the signal on the sending end after Hadamard transform (FIG. 17D). Therefore, the correlation value is sought by either fast Hadamard transform or inverse Hadamard transform via a fast Hadamard transform (FHT) circuit.

Since 6 bits are converted to a 64-value signal at the sending end, here, 64 correlation outputs are sought for the Ich and Qch, respectively. Also, to prevent phase noise resulting from fading, and degradation resulting from local signal frequency errors, a circuit 208 computes $I^2+Q^2$, removes the phase component, and determines the power of the correlation value.

Figure 19A:
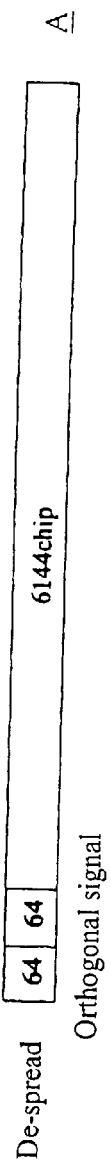
FIGS. 19A to 19D are signal sequence diagram for the receiving means in FIG. 18.
Figure 19B:
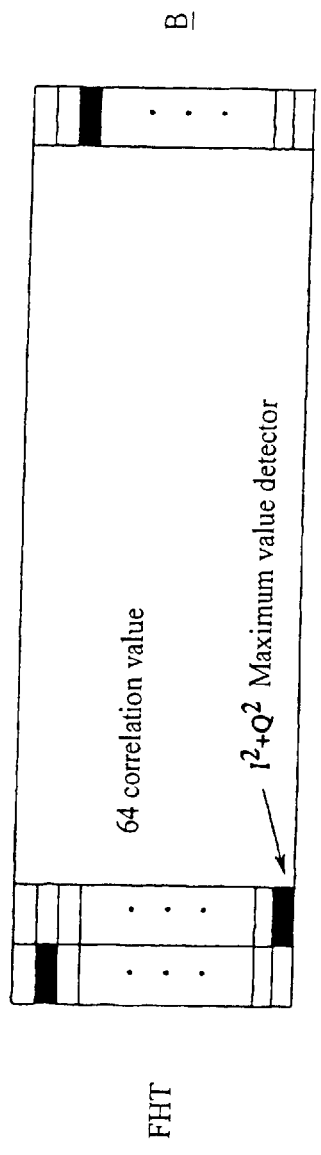
Figure 19C:
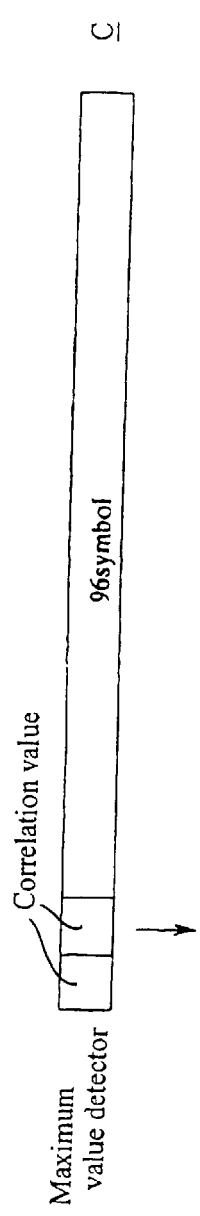

Here, FIG. 19B depicts the sought-after 64 correlation values, and the blackened in correlation value is that correlation value of the 64 correlation values $(I^2+Q^2)$ with the maximum value. Therefore, when a propagation path is not taken into consideration, the maximum $(I^2+Q^2)$ from a single finger is outputted as the correlation value.

In FIG. 18, since a RAKE system is used, with regard to the 64 $(I^2+Q^2)$ outputs corresponding to 64 correlation values from each of the different fingers 1–4, a synthesis circuit 209 synthesizes the correlation value outputs from the respective corresponding fingers 1–4. This synthesizes multipath (in FIG. 18B, four paths) correlation value outputs, increases the level of the correlation value, and heightens the probability of the correlation value.

Further, correlation peak timing is determined in a path search segment not shown in the figure, and $(I^2+Q^2)$ outputs from fingers 1–4 depicted in FIG. 18, are outputted from fingers 1–4 based on the determined correlation Peak timing, which possesses respective inter-peak time differences, and inputted to a synthesis circuit 209.

Figure 19D:
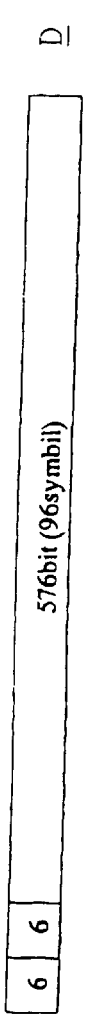

Outputs from 64 synthesis circuits 209 are inputted to a maximum value selection circuit 210, which selects and outputs a maximum value thereof. This, as shown in FIG. 19 C, produces an orthogonal signal sequence with the correlation value as the maximum value. This orthogonal signal sequence undergoes de-conversion processing relative to the convolutional coding at the sending end, regenerating a data signal as shown in FIG. 19D.

As explained above, since a pilot signal is not utilized in the uplink of a IS-95 standard system, coherent detection is not employed. If coherent detection can be achieved, this would make it possible to enhance error rate characteristics over those of non-coherent detection.

Figure 20:
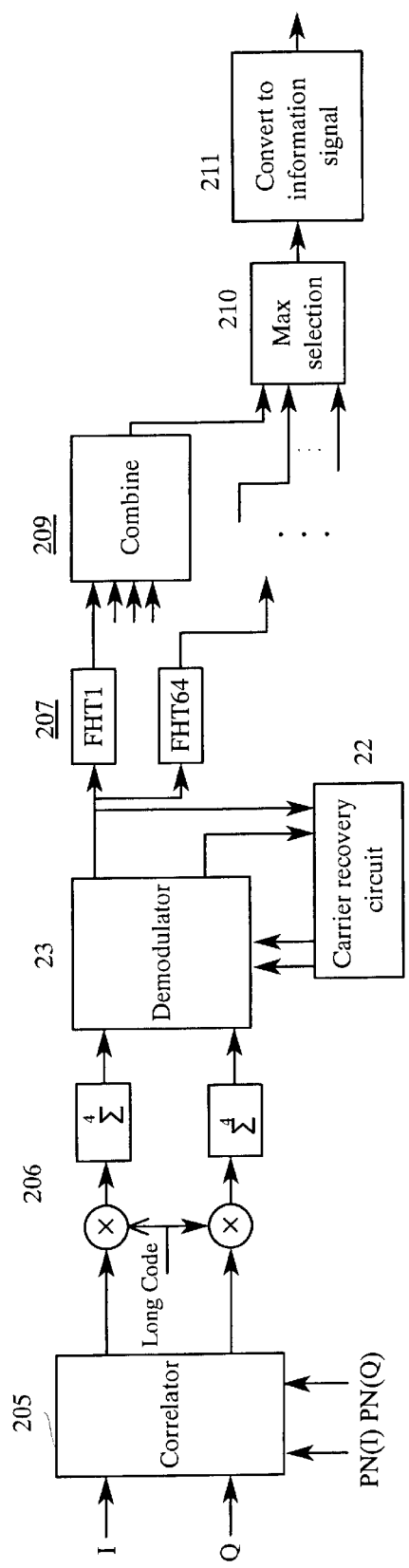
FIG. 20 is a diagram of conceptual configuration for a coherent detection system, which uses a feedback loop.

However, up until now, there has not been a proposal for using coherent detection at the receiving end with orthogonal M-ary modulation using orthogonal signals, which is typical of an IS-95-compliant system. Here, when a coherent detection system is considered, it is easy to imagine a method which uses a feedback loop as shown in FIG. 20. That is, a carrier wave regenerated by a carrier wave regenerator. 22 depicted in FIG. 20 is fed back to a phase rotator, i.e. a demodulator 23, and used in demodulation. However, a method which utilizes a feedback loop like this has the following problems.

Firstly, low carrier-to-noise (C/N) operation is extremely unstable. Also, the indeterminate removal of phase at synthesis is difficult. Lead-in time is also long. And cycle skip also occurs. Coherent detection has merit in a high C/N static environment, and other than these problems, the error rate deteriorates more than with non-coherent detection.

Therefore, the present invention proposes a novel method for determining a reference phase for performing coherent detection, correspondingly to a sending end that carries out orthogonal M-ary modulation using an orthogonal signal, and which solves for these problems.

Figure 1A:
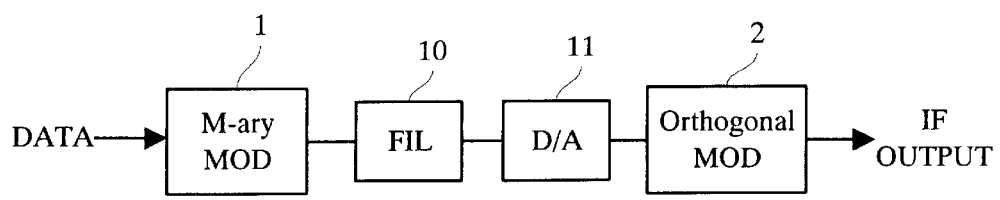
FIGS. 1A and 1B are block diagrams of a radio communication system for explaining the basic concept behind the present invention.
Figure 1B:
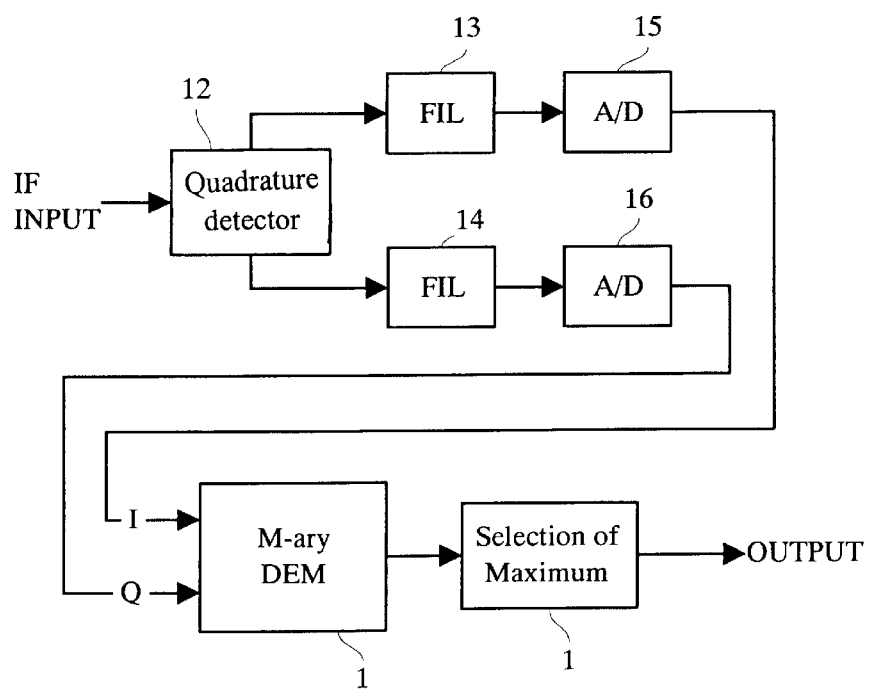

FIGS. 1A and 1B depict block diagrams of a radio communication system for explaining the basic concept behind the present invention. FIG. 1A depicts a block diagram of orthogonal M-ary modulation using an orthogonal signal, which is the premise of the present invention. A block diagram of the receiving end, which manifests the characteristics of the present invention corresponding thereto is depicted in FIG. 1B.

In FIG. 1A, data DATA corresponds to an orthogonal signal, such as the convolutional code, for example, described in FIG. 16. This orthogonal signal undergoes Hadamard transformation in an orthogonal M-ary modulator 1. After that, bandwidth is limited by a filter 10, the orthogonal signal is converted to an analog signal by a D/A converter 11, and is subjected to orthogonal modulation, such as QPSK modulation, by an orthogonal modulator 2, and then outputted as an IF signal.

Conversely, FIG. 1B depicts the configuration of a receiving end that conforms to the present invention, which corresponds to the configuration of the sending end depicted in FIG. 1A. A received IF signal is split into Ich and Qch components by a quadrature detector 12, and are respectively converted to digital signals by a filter 13, 14 and an A/D converter 15, 16.

The Ich, Qch digital signals from the A/D converters 15, 16 are guided to an orthogonal M-ary demodulator 17. At this point, the Ich, Qch digital signals respectively undergo either fast Hadamard transform or inverse Hadamard transform by the orthogonal M-ary demodulator 17.

The present invention is characterized in that $(I^2+Q^2)$ is obtained from the output of either the fast Hadamard transform or the inverse Hadamard transform, and an I, Q correlation value is selected with this as maximum, and is used as the reference phase. In FIG. 1, this function is achieved by a maximum value detection & output circuit 18.

Figure 2:
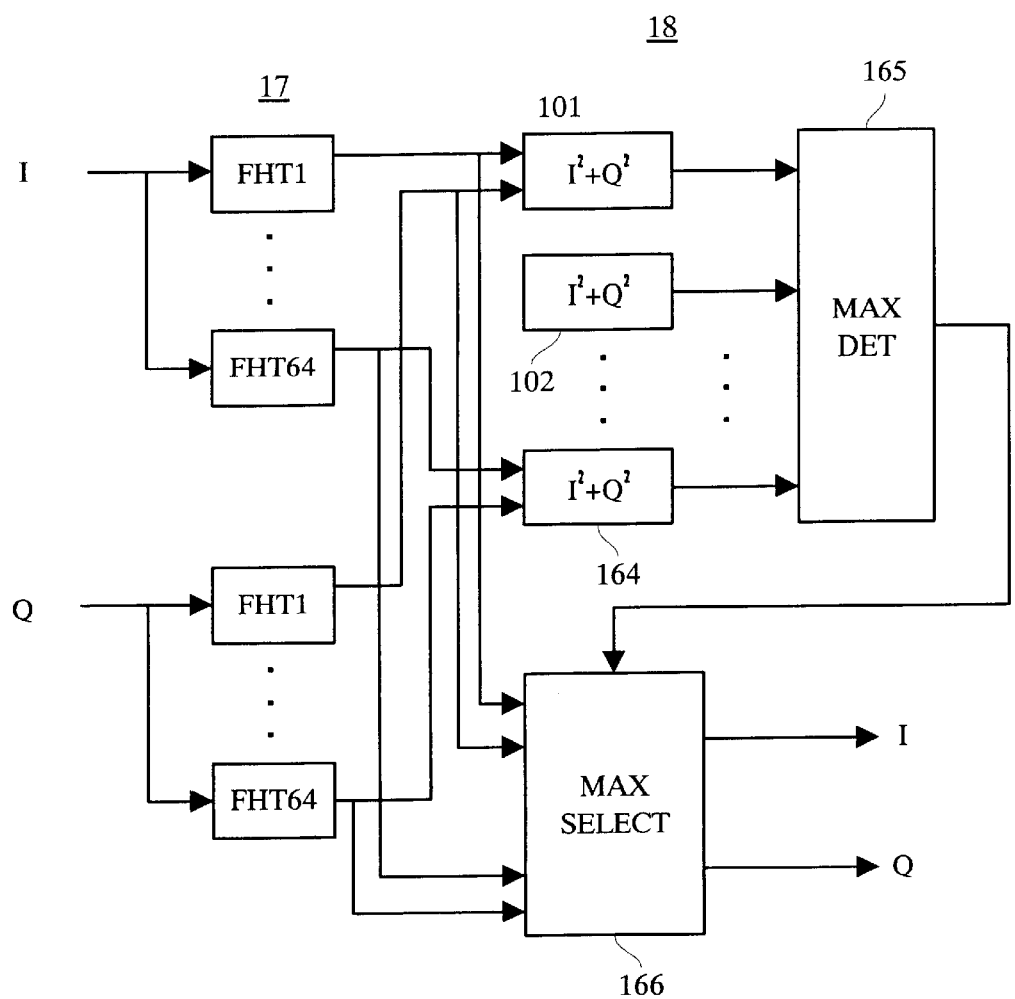
FIG. 2 is an embodiment of an orthogonal M-ary demodulator 17 and a maximum value detection & output circuit 18 of FIG. 1B.

FIG. 2 depicts an embodiment of an orthogonal M-ary demodulator 17 and a maximum value detection & output circuit 18. The Ich, Qch digital signals from the A/D converters 15, 16 are guided to orthogonal M-ary demodulators 17, that are, fast Hadamard transform circuits. If it is assumed here that M-ary is a signal sequence of 64 values, the fast Hadamard transform circuits 17 produce 64 correlation outputs for Ich, Qch, respectively.

This 64 correlation outputs are inputted to a maximum value selection & output circuit 166, and are also inputted to arithmetic circuits 101–164, which respectively compute $(I^2+Q^2)$. Since power is determined by the computation of $(I^2+Q^2)$ in the arithmetic circuits 101–164, it is not subject to the effects of phase fluctuation.

Therefore, of the 64 correlation outputs outputted from the arithmetic circuits 101–164, the correlation value for which the power becomes the maximum value is detected by a maximum value detector 165. Next, based on the detection results of this maximum value detector 165, a pair of correlation values for Ich, Qch, for which the power is the maximum value, are selected and outputted from a maximum value selection & output circuit 166. This makes it possible to perform phase coherent detection having the phase of the obtained correlation value as a reference phase.

As described above, in the present invention, focusing on the maximum correlation output value of in-phase and quadrature components of a fast Hadamard transform or inverse Hadamard transform is similar to pilot-interpolated coherent detection. That is, pilot-interpolated coherent detection is a method, whereby a pilot signal is coherently inserted into a signal, and coherent detection is performed by using this as the reference phase.

The present invention differs from this method in that there is no pilot signal to use as a reference phase. In the present invention, $(I^2+Q^2)$ is determined from a pilot-less signal, and I, Q correlation value with this as the maximum is selected. Then, since the selected I, Q correlation value is used as a reference phase, the present invention is equivalent in that a pilot signal is detected, and the phase thereof is utilized as a reference phase.

By using the reference phase thus created by the present invention, it is possible to perform coherent detection of the received signal. As yet another application, the present invention can also be used in an interference canceler for canceling interference waves upon receipt of an orthogonal signal.

Figure 3A:
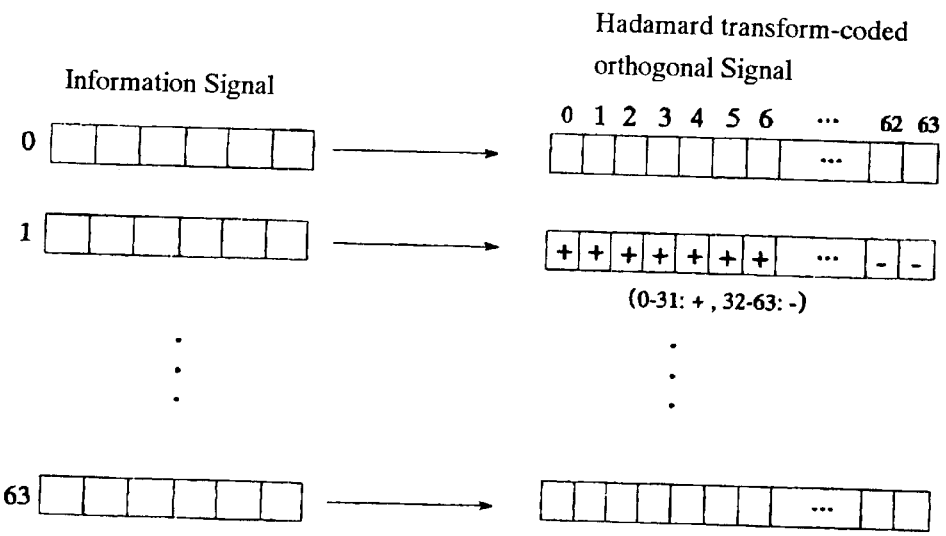
FIGS. 3A and 3B are block diagrams of fast Hadamard transform for explaining principle of the present invention.

Next, the principle by which the output of a fast Hadamard transform becomes a reference phase as described above is explained using FIG. 3. Now, consider the Hadamard transform of 64 values, in which a 6-bit signal is treated as a single symbol, as shown in FIG. 3A. In this case, 32 bits of a Hadamard transform-coded orthogonal signal are + coded, and the other 32 bits are – coded.

Figure 3B:
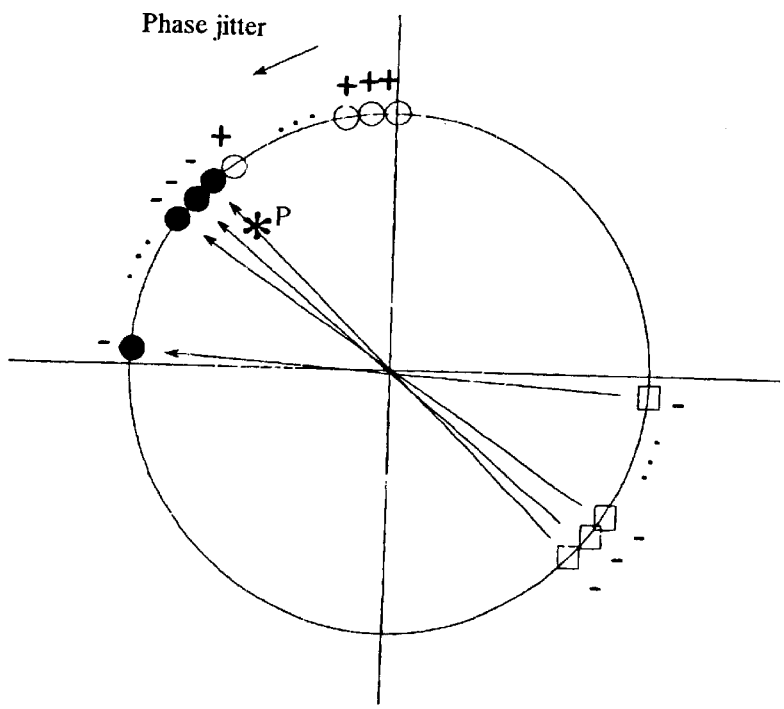

Therefore, as a result of phase jitter, the received signal (++··++––··––) is received as shown in FIG. 3B. In this case, in FIG. 3B, received signals (++··++) are indicated by ○, and received signals (––··––) are indicated by □.

By obtaining a correlation using a fast Hadamard transform at the receiving end, all the "–" code signals in the fourth quadrant are returned to the second quadrant, indicated with ●, and added. Therefore, the average value of the 64 chips becomes P, the average phase in one symbol period is obtained, and this can be used as the reference phase.

Figure 4:
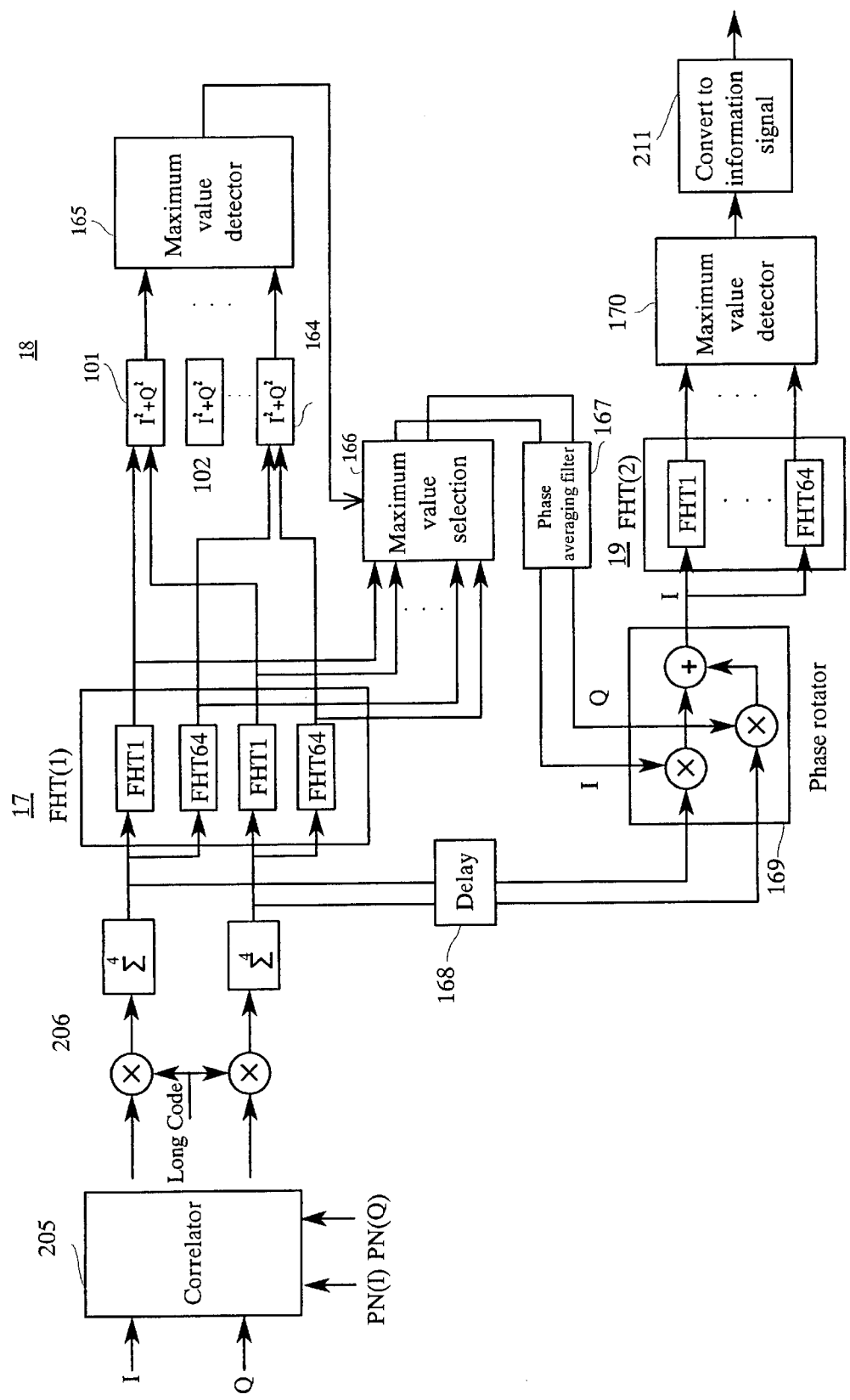
FIG. 4 is a block diagram of an embodiment of the present invention, which applies to the receiving end of an IS-95-complicant system.

FIG. 4 depicts a block diagram of an embodiment of the present invention, which applies to the receiving end of an IS-95-compliant system a method for determining a reference phase based on the above-described principle, and enables coherent detection. FIG. 4 depicts a configuration that lacks diversity combine. In FIG. 4, those parts assigned the same numbers as parts in FIG. 18 perform the same functions. Therefore, explanations of the operation of these parts are omitted.

A maximum value detector 165 detects the maximum value of 64 ($I^2+Q^2$) outputs, as explained using FIG. 2. Based on this information, a pair of I, Qsignals with ($I^2+Q^2$) as the maximum are selected and outputted by a maximum value selection & output circuit 166.

The phases of the respective I, Q signals selected by the maximum value selection & output circuit 166 at this time are Littering as depicted by the ○ and ● in FIG. 3B, and the phase of the center point P can be obtained as the average phase of a single symbol. This average phase is determined by a phase averaging filter 167, and guided to a phase rotator 169.

Meanwhile, the output of a de-spreader 206 is timing adjusted in a delay circuit 168 and inputted to the phase rotator 169. Therefore, the phase rotator 169 performs complex multiplication operations on these inputs, and, using the above-described average phase as reference, subjects the output of the de-spreader 206 to demodulation corresponding to the binary phase shift key (BPSK) modulation on the sending end.

That is, reference phase signals with mutually different π/2 phases, which were each determined by a filter 167, are multiplied with Ich, Qch signals from a delay circuit 168. These multiplication results are then synthesized. This processing is the reverse of the BPSK modulation processing at the sending end, and the fact that coherent detection is carried out in the phase rotator 169 using the determined reference phase can therefore be understood.

Coherent detection output from the phase rotator 169 is propagated through a second fast Hadamard transform circuit 19 and maximum value detection means 170, and inputted to a converter 211 for conversion to a data signal. This second fast Hadamard transform circuit 19 has the same configuration as the first fast Hadamard transform circuit 17, and the configuration of the maximum value detection circuit 170 corresponds to those of the ($I^2+Q^2$) arithmetic circuits 101–164 and maximum value detector 165.

The converter 211, as explained above with reference to FIG. 18, performs de-conversion, corresponding to convolutional coding on the sending end, for an orthogonal signal sequence outputted from a maximum value detection circuit 170, and regenerates a data signal.

In the configuration of the embodiment depicted in FIG. 4, attention is focused on the maximum correlation output value of the fast Hadamard transform circuit 17. A signal received at this time has a cycle of 208.3 μsec, that is, one cycle of a Hadamard matrix regenerates a value approximating the phase status of the propagation path. Therefore, this signal is used as the reference phase signal.

Figure 5:
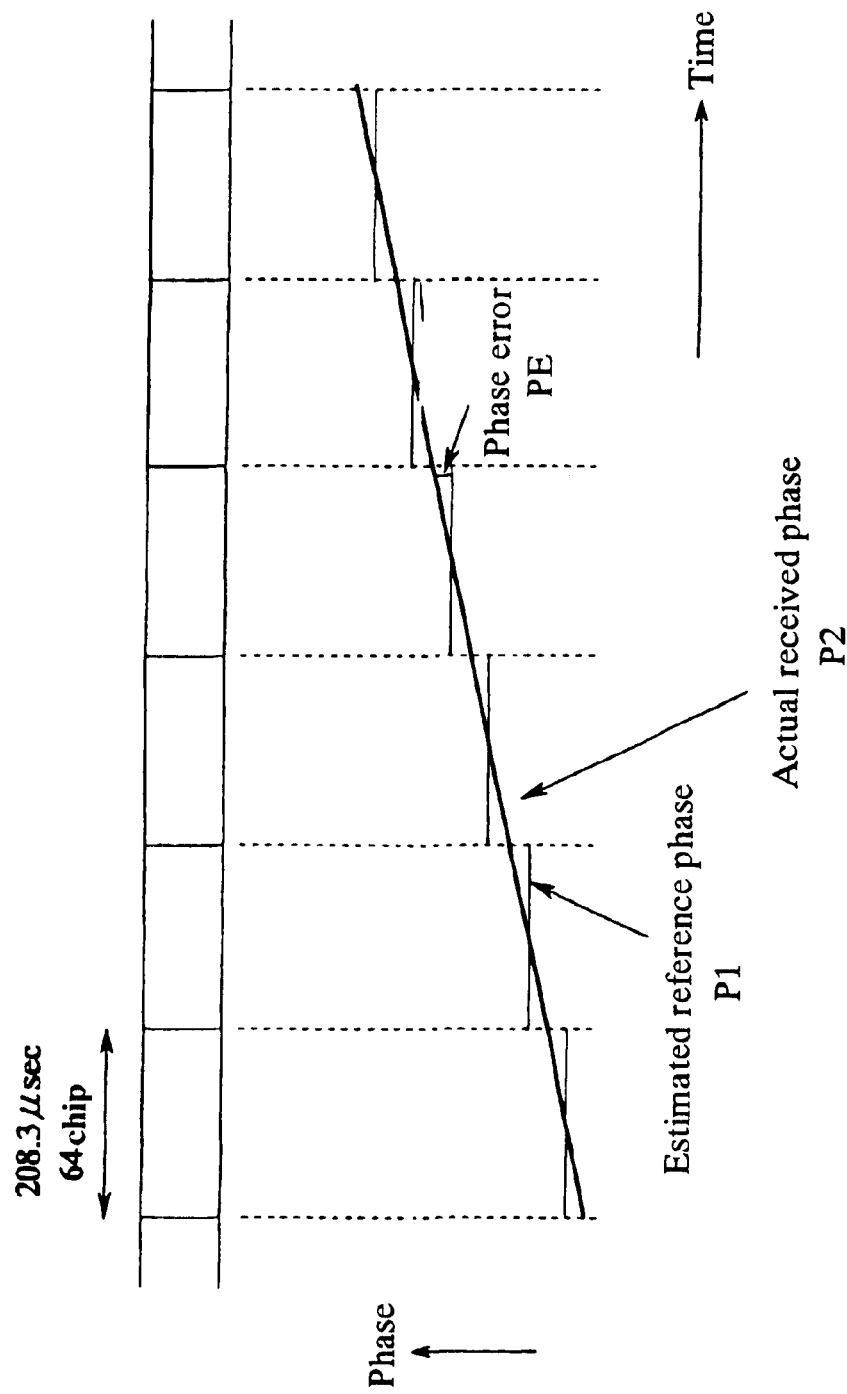
FIG. 5 is a diagram explaining a reference phase and a phase error.

As explained above with reference to FIG. 3B, here, the lo average phase in a symbol period is obtained at point P as the reference phase signal. Since it is not possible to obtain consecutive reference phases, as shown in FIG. 5, a phase error PE occurs in the average phase in a symbol period (64 chips: 208.3 μsec), that is, in the estimated reference phase P1 relative to the actual consecutive received phase P2.

Accordingly, consideration is given to reducing this phase error PE in the phase averaging filter 167 in FIG. 4.

FIG.'s 6 through 8 depict embodiments for reducing this phase error PE.

Figure 6:
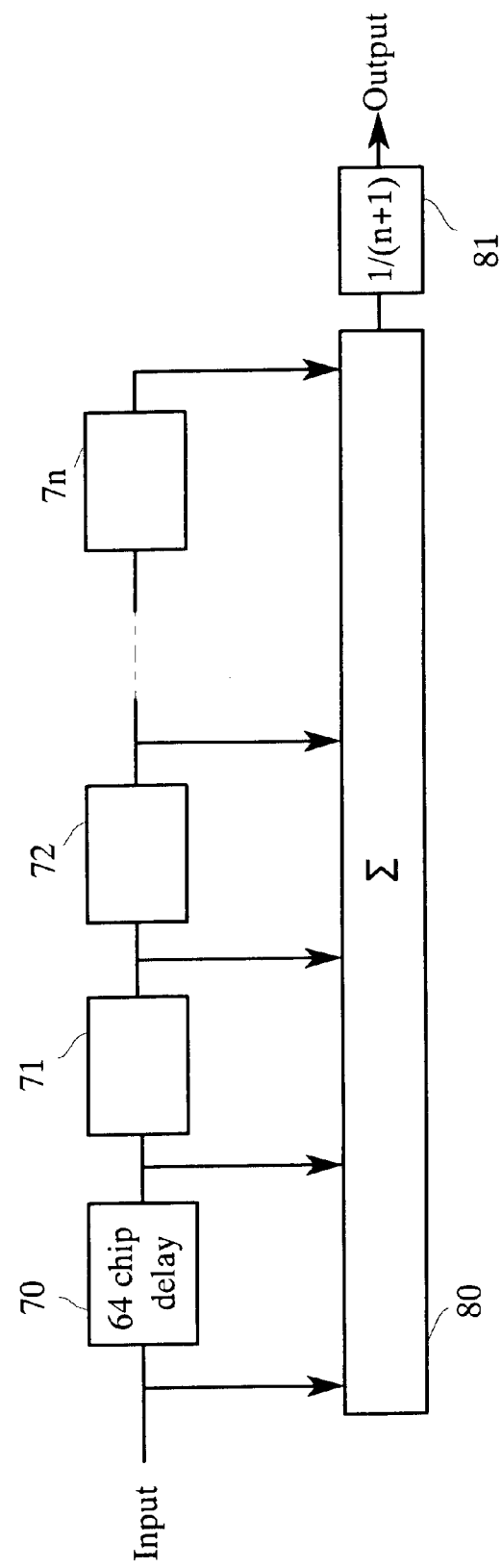
FIG. 6 is a block diagram of simplified configuration of the moving average filter.
Figure 7:
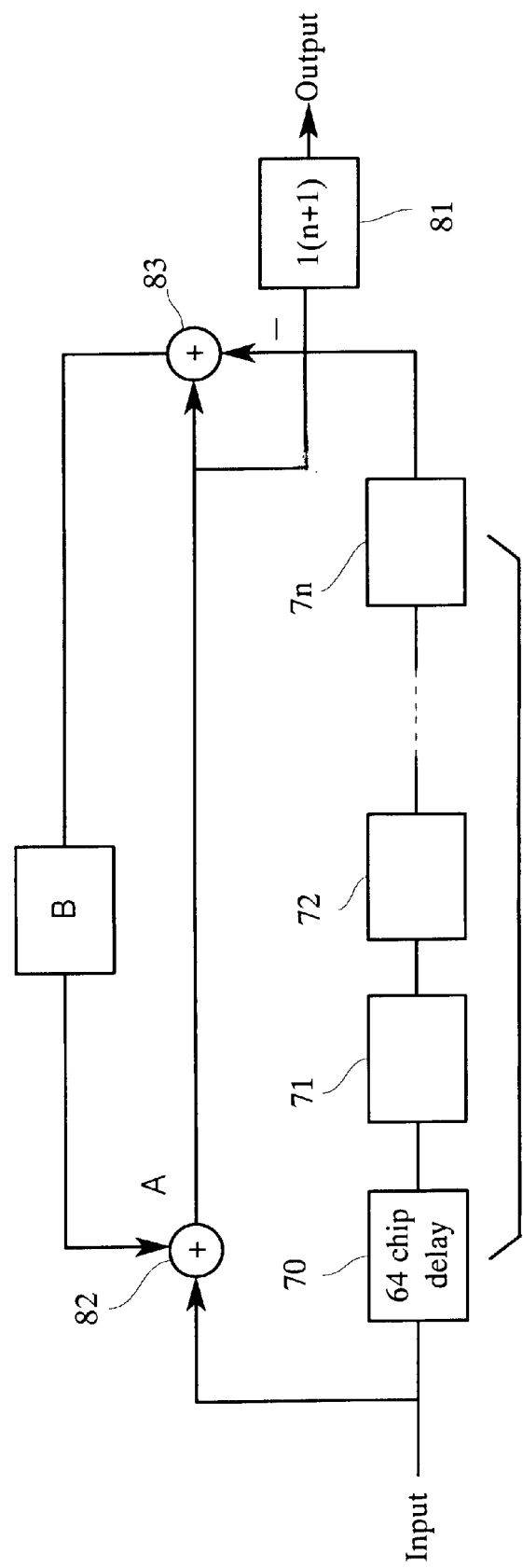
FIG. 7 is a block diagram of simplified configuration of the moving average filter shown in FIG. 6.
Figures 8A, 8B, 8C, 8D:
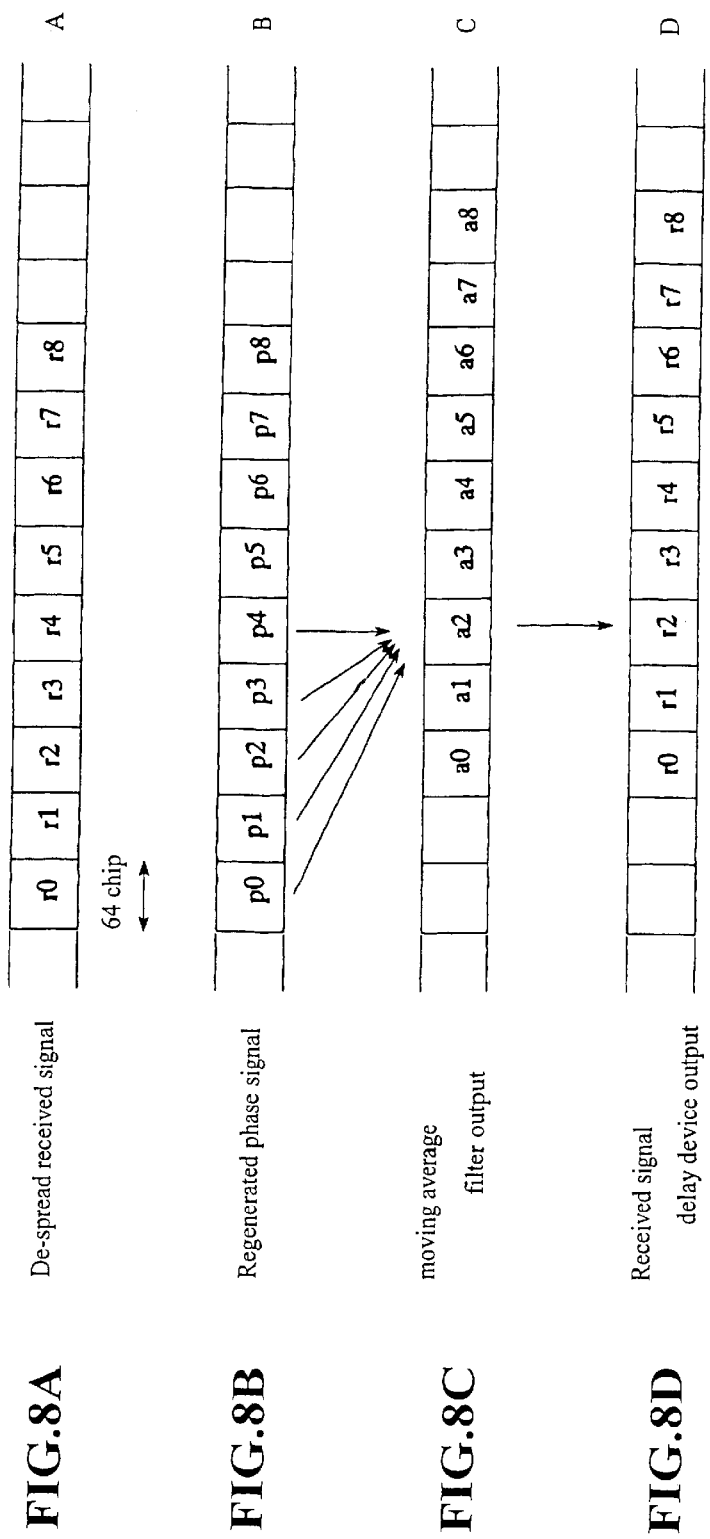
FIGS. 8A to 8D are diagrams for explaining phase matches of de-spread received signal with outputs of an moving average filter.

FIG. 6 depicts a moving average filter, comprising a plurality of n symbol (64-chip) delay devices 70–7n, an adder 80, which performs addition corresponding to delay devices 70–7n, and a divider 81. By comparison with FIG. 6, FIG. 7 simplifies the configuration of the adder 80 in FIG. 6 by using two adder 82, 83 and a delay circuit B in a feedback circuit.

With these moving average filters, a reference phase for a particular symbol is obtained by averaging the phase signals of n symbols before and after that symbol. Now, consider n=2, that is, a five symbol moving average filter. As shown in FIGS. 8A to 8D, if a de-spread received signal A is delayed by two symbols and treated as the output D of delay device 168, this output D matches the phase resulting from the outputting of a regenerated phase signal B as an average phase by a moving average filter 167.

Then, by subjecting the outputs of the moving average filter 167 to complex multiplication and counting in a phase rotator 169, QPSK modulation-corresponding demodulation is performed, that is, coherent detection is possible. The phase of a de-spread signal A is determined.

Next, a demodulated Ich signal is inputted to a second fast Hadamard transform circuit 19, and a correlation value is determined. The maximum value of the 64 types of correlation values determined is detected by a circuit 170, this maximum value is converted to a data signal by a converter 211 and outputted.

Here, as shown in FIG. 5, because a reference phase signal is immobilized in a symbol period (64 chips), the phase errors at the head and tail ends of a symbol increase. Consequently, the linear received phase as shown in FIG. 5 is achieved by primary linear interpolation.

Figure 9:
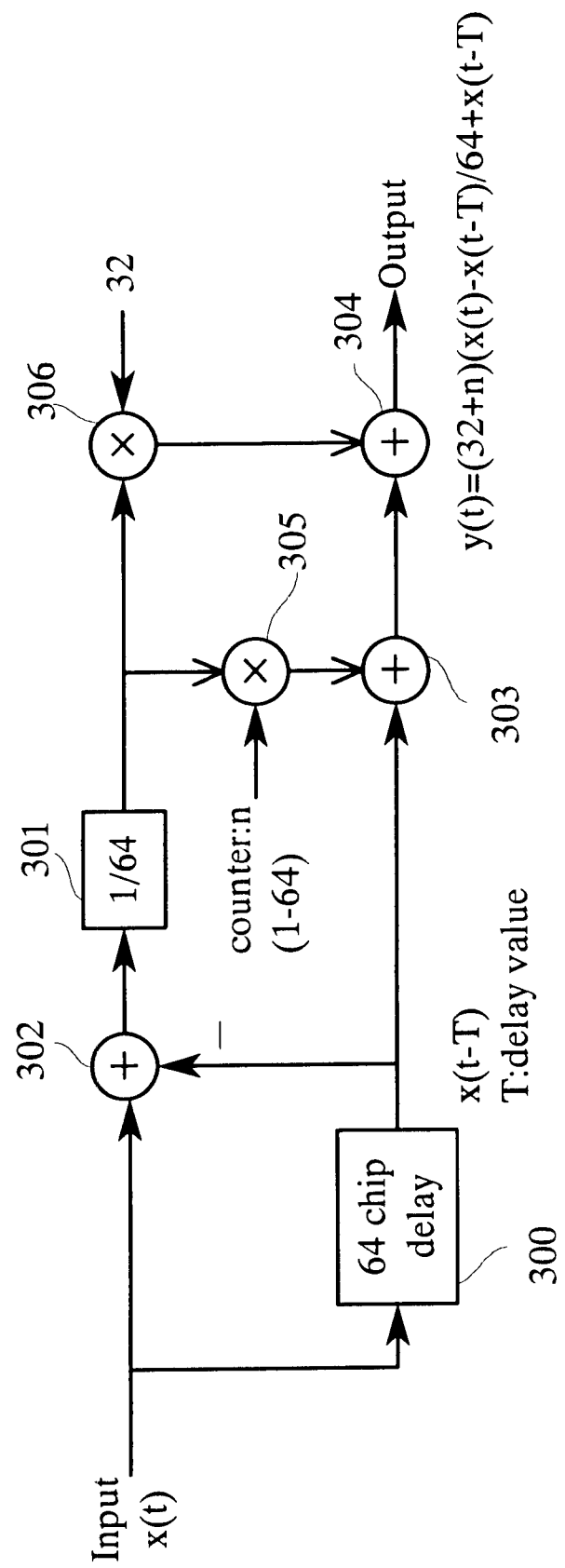
FIG. 9 is an example of a filter configuration for performing primary linear interpolation, as another embodiment for a phase equalizer.

As another embodiment of a phase equalizer 167, FIG. 9 depicts an example of a filter configuration for performing this primary linear interpolation. This embodiment includes a single symbol delay device 300, a 1/64 frequency divider 301, modulo 2 adders 302, 303, 304 and multipliers 305, 306. A counter value n, not shown in the figure, is inputted to multiplier 305. The counter 305 counts from 1 to 64, so that 1 is at the head of a symbol. Signal delay is for one symbol.

The output y (t) generated by this configuration is expressed as shown below.

$$y(t)=(32+n)\{x(t)-x(t-T)\}/64+x(t-T)$$

Figure 10:
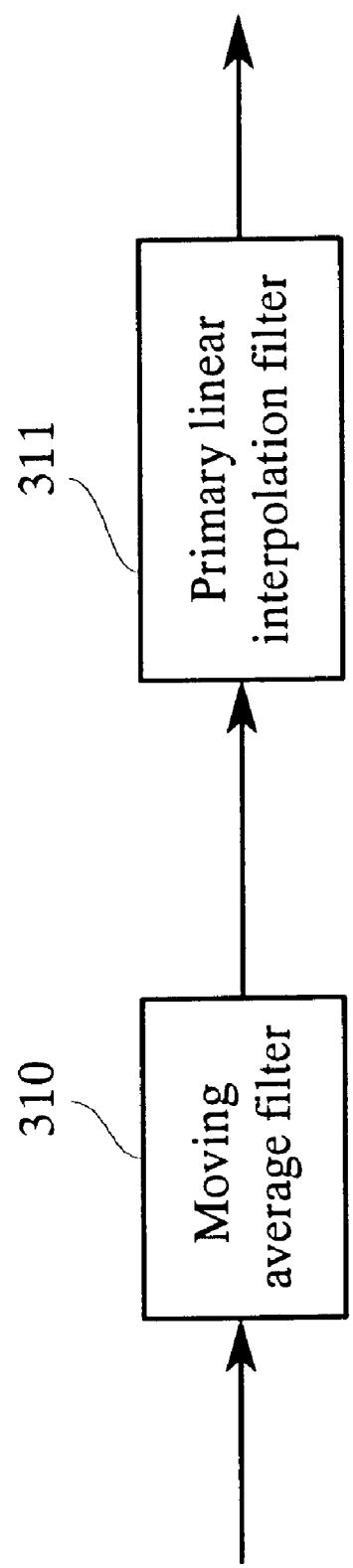
FIG. 10 is a configuration which combines a moving average filter with the primary linear filter shown in FIG. 19.

FIG. 10 depicts a configuration which combines a moving average filter 310 with the primary linear filter 311 depicted in FIG. 9. Rather than directly inputting a signal with a poor signal-to-noise (S/N) ratio into the primary linear filter or linear interpolation filter 311, inputting a signal which has been eliminated of noise by a moving average filter 310 makes it possible to sample a high-precision reference phase.

Figure 11:
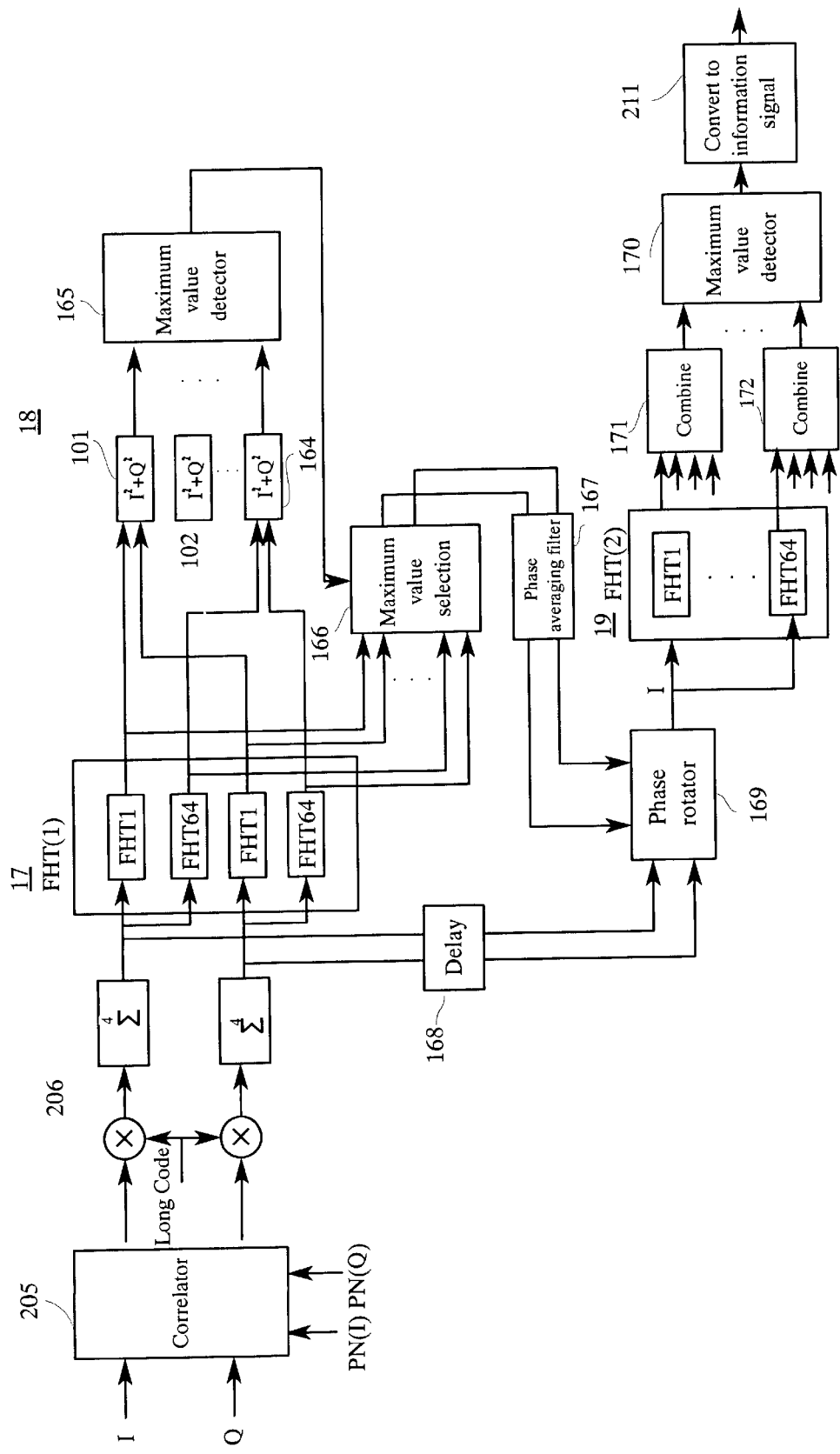
FIG. 11 is a block diagram of an example of a configuration when diversity synthesis is performed on the configuration in FIG. 4.

FIG. 11 depicts an example of a configuration when diversity combine is performed. The difference with the configuration depicted in FIG. 4 is that the outputs from the second fast Hadamard transform circuit 19 undergo RAKE combine for each four paths (branches and fingers), to absorb errors resulting from the paths.

Figure 12:
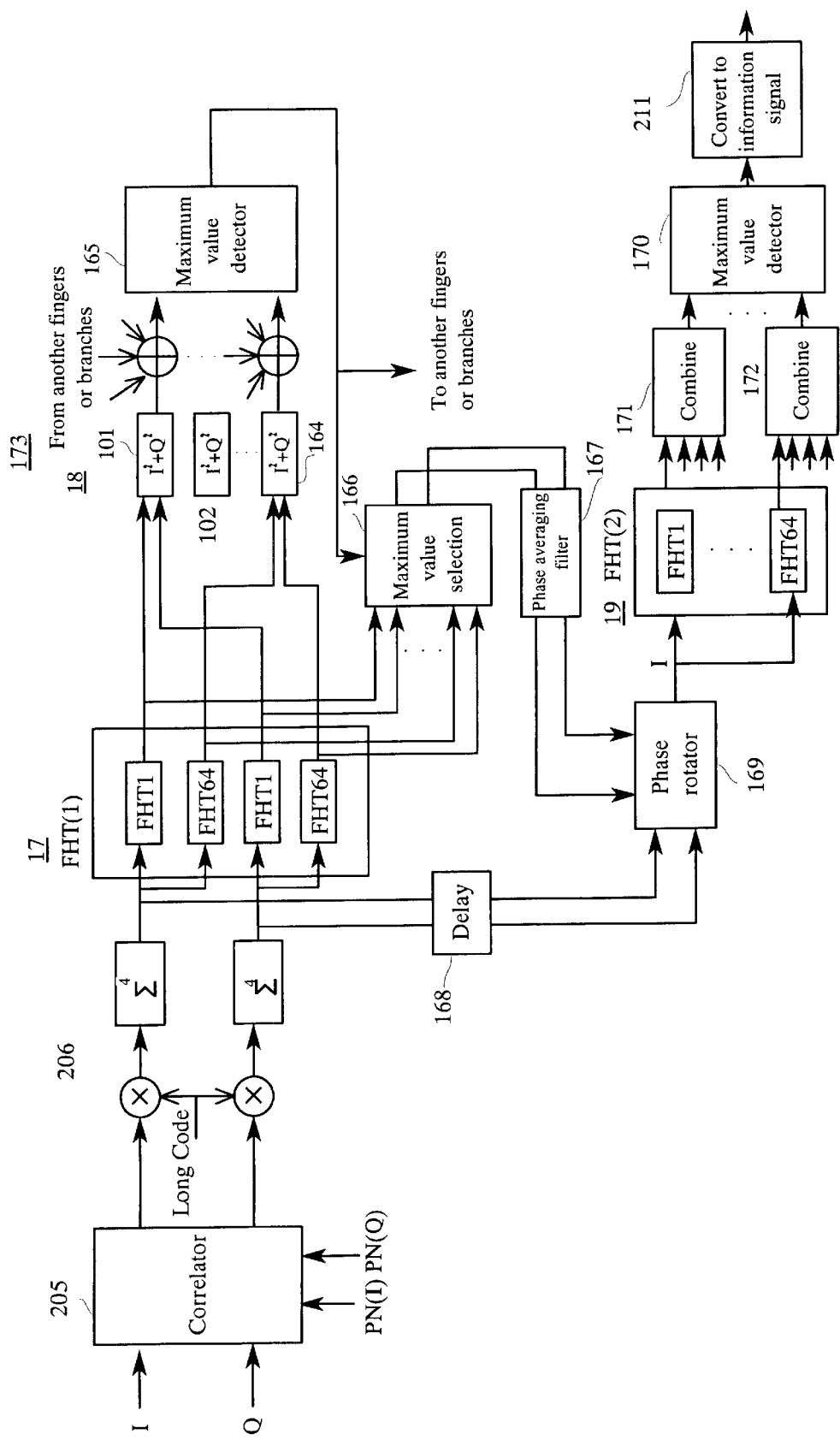
FIG. 12 is a block diagram of an xample which, in addition to the configuration depicted in FIG. 11, applies RAKE synthesis to the output from the first fast Hadamard transform circuit 207, enhancing error characteristics.
Figure 13:
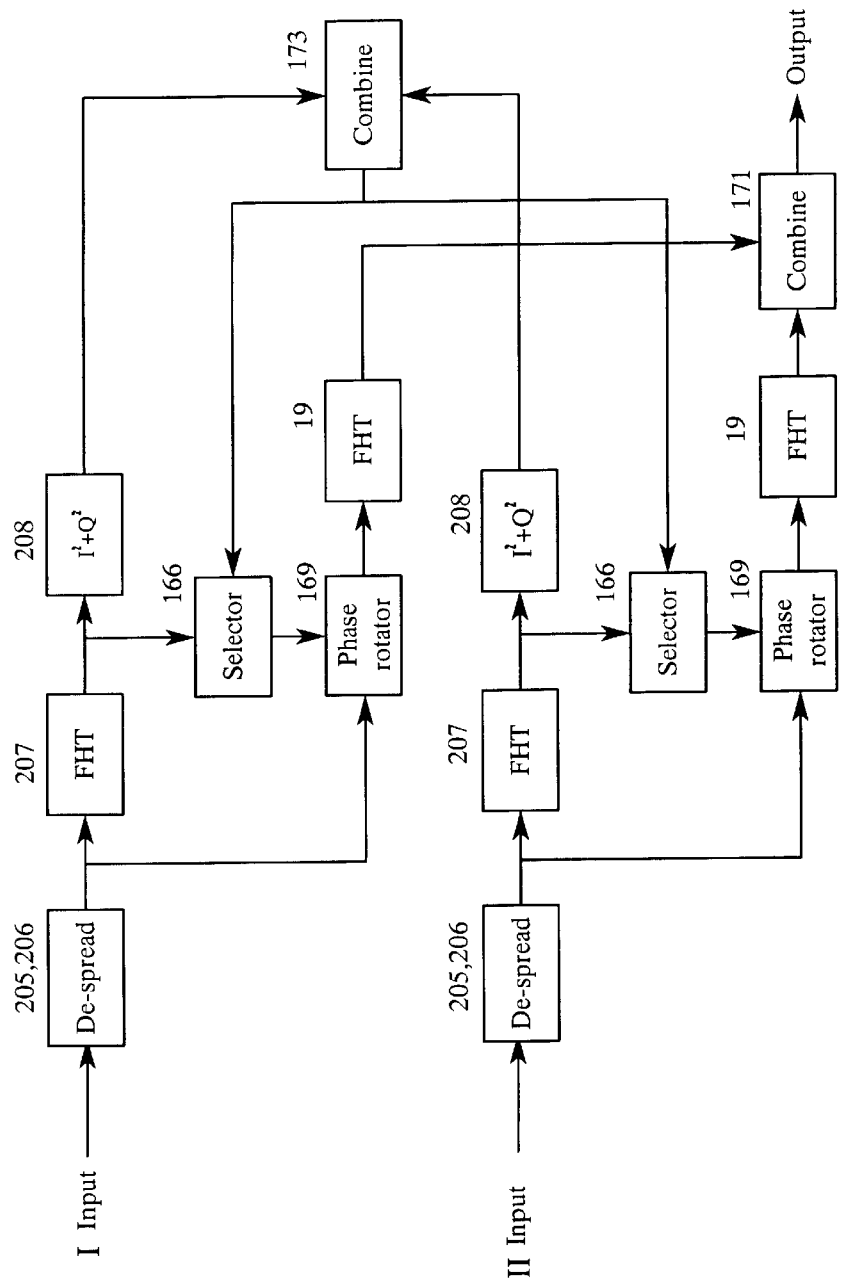
FIG. 13 is a conceptual drawing in which two paths are synthesized in configuration of FIG. 12.

FIG. 12 depicts an example which, in addition to the configuration depicted in FIG. 11, applies RAKE combine to the output from the first fast Hadamard transform circuit 17 as well, enhancing error characteristics. FIG. 13 depicts a conceptual drawing in which two paths are combined. The upper half of FIG. 13 depicts path I, and the lower half depicts path II.

A combiner 173 combines $I^2+Q^2$ of paths I, II, and controls the selection of the selectors 166 of both paths via this output. Combiner 171 combines the outputs of the second fast Hadamard transform circuits 19 of both paths. Next, the maximum value of the output of this combiner 171 is outputted, and code converted into a data signal.

Figure 14:
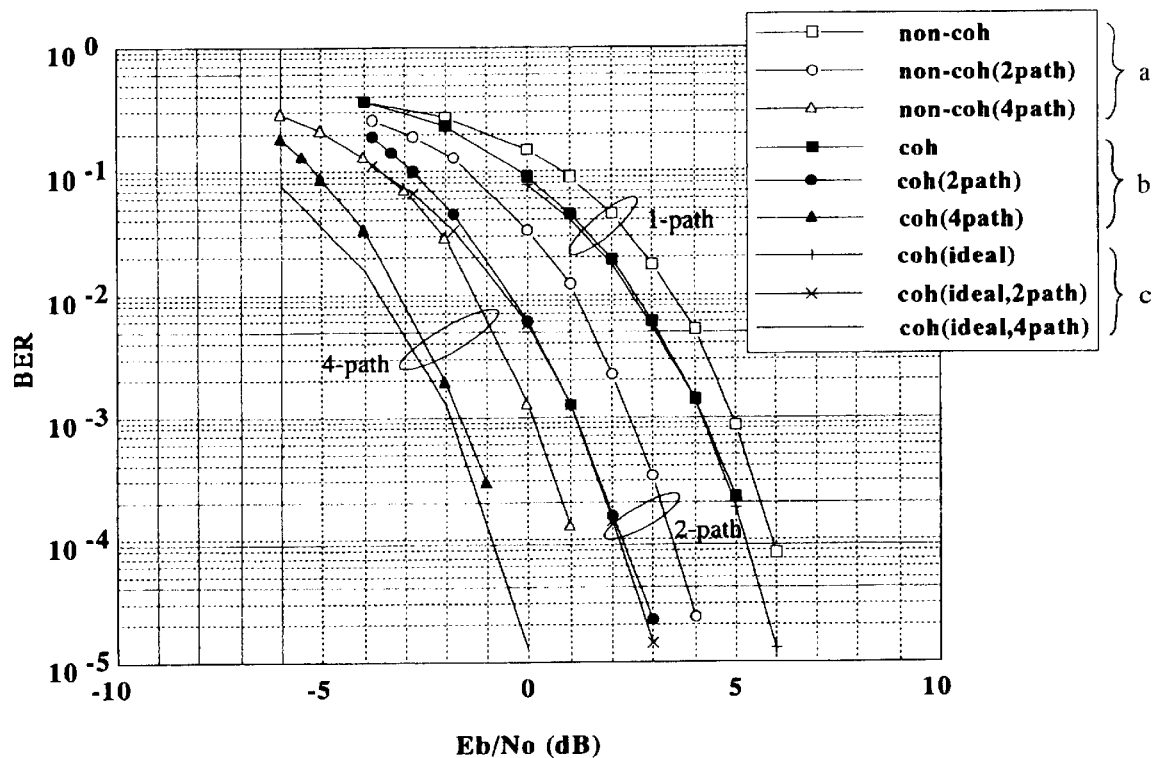
FIG. 14 is a diagram comparing error rate characteristics resulting from the present invention when there is no fading, with those of a non-coherent detection system.

FIG. 14 depicts a diagram comparing error rate characteristics resulting from the present invention when the above-described moving average filter is used when there is no fading, with those of a non-coherent detection system. In FIG. 14, ideal values (c) for one path (branch), two paths and four paths, are compared to error rate characteristics (a) resulting from a non-coherent detection system, and error rate characteristics (b) resulting from the present invention. In all cases, the error rate characteristics (b) resulting from the present invention approximated the ideal values (c), and exhibited higher gain than the non-coherent detection system. At $10^{-2}$, gain was roughly 1 dB when propagating over one path, was roughly 1.5 dB when using two paths, and was roughly 2 dB when using four paths.

Figure 15:
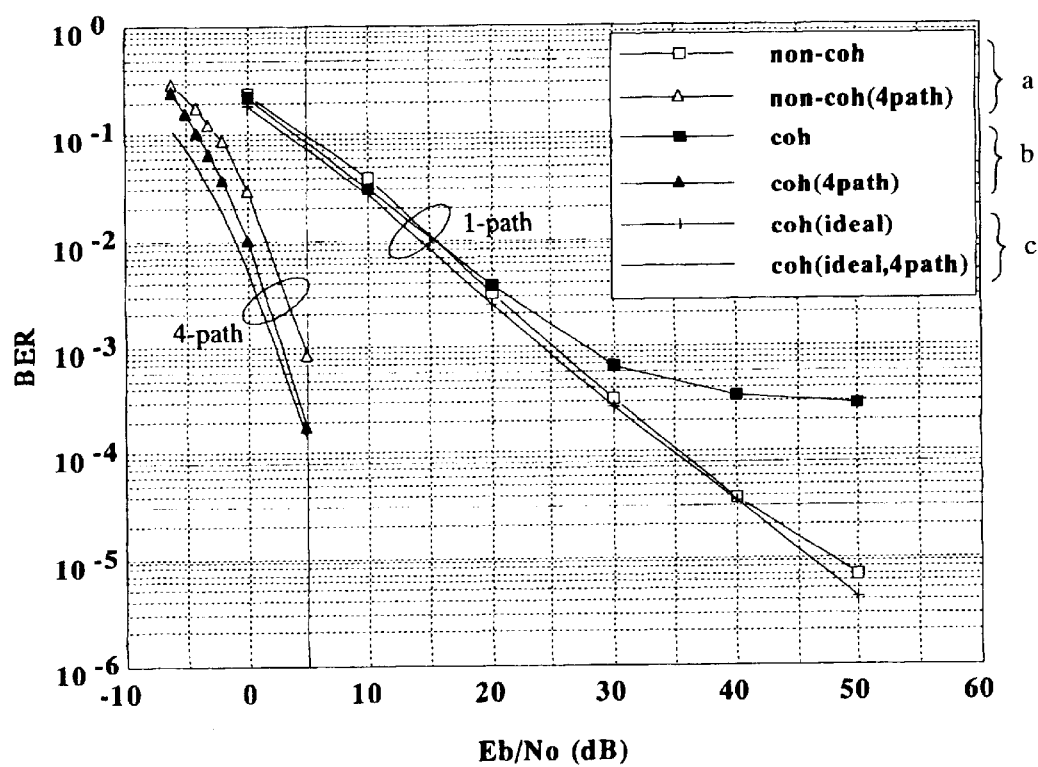
FIG. 15 is a diagram comparing error rate characteristics resulting from the present invention when there is fading (100 Hz fading frequency), with those of a non-coherent detection system.

FIG. 15 depicts a diagram comparing error rate characteristics resulting from the present invention when there is fading (100 Hz fading frequency), with those of a non-coherent detection system. At $10^{-2}$, gain was nearly identical with that of the non-coherent detection system when propagating over one path, was roughly 0.7 dB when using two paths (not shown in figure), and was roughly 1.5 dB when using four paths.

As explained above with reference to the figures, the present invention makes it possible to determine a reference phase. Therefore, a coherent detection system for a CDMA radio communications system, which uses orthogonal M-ary modulation can be readily achieved. It is also possible to use the reference phase determination method of the present invention in an interference canceler.

What is claimed is:

1. A radio communication system, comprising a plurality of base stations and terminals, said plurality of base stations and terminals being connected via spread spectrum communications, and using a code division multiple access, which performs orthogonal M-ary modulation on a data signal, followed by spread modulation, wherein each of said plurality of base stations includes:
   a circuit determining an in-phase component and a quadrature component by de-spreading a received signal sent from said terminal;
   a circuit determining correlation values of said in-phase component and quadrature component, which correspond to respective Hadamard matrices resulting from either a fast Hadamard transform or an inverse Hadamard transform performed on said in-phase component and quadrature component;
   a circuit computing the sum of the squares of the respective correlation values of said in-phase component and quadrature component;
   a circuit selecting either said fast Hadamard transform or inverse Hadamard transform output, which outputs the maximum value of said computed sum of the squares;
   a circuit carrying out coherent detection by complex multiplication of said selected fast Hadamard transform or inverse Hadamard transform output, and said in-phase component and quadrature component determined via said de-spreading;
   a circuit determining the correlation value by performing either a fast Hadamard transform or an inverse Hadamard transform on said coherent detection output; and
   a circuit converting to a data signal a Hadamard matrix corresponding to the maximum value of said determined correlation value.

2. A radio communication system comprising: a plurality of base stations and terminals, said plurality of base stations and terminals being connected via spread spectrum communications, and using a code division multiple access system, which performs orthogonal M-ary modulation on a data signal, followed by spread modulation,
   each of said plurality of base stations including a plurality of receiving branches and fingers, and said plurality of receiving branches and fingers having:
      a circuit determining an in-phase component and a quadrature component by de-spreading a received signal sent from said terminal;
      a circuit determining correlation values of said in-phase component and quadrature component, which correspond to respective Hadamard matrices resulting from either a fast Hadamard transform or an inverse Hadamard transform performed on said in-phase component and quadrature component;
      a circuit computing the sum of the squares of the respective correlation values of said in-phase component and quadrature component;
      a circuit selecting either said fast Hadamard transform or inverse Hadamard transform output, which outputs the maximum value of said computed sum of the squares;
      a circuit carrying out coherent detection by complex multiplication of said selected fast Hadamard transform or inverse Hadamard transform output, and the in-phase component and quadrature component determined via said de-spreading;
      a circuit determining the correlation value by performing either a fast Hadamard transform or an inverse Hadamard transform on said coherent detection output;

a circuit converting to a data signal a Hadamard matrix corresponding to the maximum value of said determined correlation value;
a circuit combining said determined correlation value with correlation values from other branches and fingers; and
a circuit converting to a data signal a Hadamard matrix corresponding to the maximum value of the synthesized correlation values of said plurality of receiving branches and fingers.

3. The orthogonal M-ary modulation-utilizing radio communication system according to claim 2, further comprising: a synthesizer synthesizing the output of a circuit that computes said sum of squares for said plurality of receiving branches and fingers, wherein the circuit selecting either said fast Hadamard transform or inverse Hadamard transform output, selects the fast Hadamard transform or inverse Hadamard transform output, which has the combined output of said combiner as the maximum value.

4. The orthogonal M-ary modulation-utilizing radio communication system according to claim 1, further comprising: a moving average filter, which equalizes said fast Hadamard transform or inverse Hadamard transform output, which outputs the maximum value of said computed sum of the squares.

5. The orthogonal M-ary modulation-utilizing radio communication system according to claim 2, further comprising: a moving average filter, which equalizes said fast Hadamard transform or inverse Hadamard transform output, which outputs the maximum value of said computed sum of the squares.

6. The orthogonal M-ary modulation-utilizing radio communication system according to claim 1, further comprising a primary linear interpolation filter equalizing said fast Hadamard transform or inverse Hadamard transform output, which outputs the maximum value of said computed sum of the squares.

7. The orthogonal M-ary modulation-utilizing radio communication system according to claim 2, further comprising a primary linear interpolation filter equalizing said fast Hadamard transform or inverse Hadamard transform output, which outputs the maximum value of said computed sum of the squares.

8. The orthogonal M-ary modulation-utilizing radio communication system according to claim 4, further comprising a primary linear interpolation filter, which performs primary linear interpolation on the output of said moving average filter.

9. A base station utilizing a radio communication system that uses a code division multiple access system, which performs orthogonal M-ary modulation on a data signal, followed by spread modulation, said base station comprising:
means for determining an in-phase component and a quadrature component by de-spreading a spread spectrum signal sent from a terminal;
means of determining correlation values of said in-phase component and quadrature component, which correspond to respective Hadamard matrices resulting from either a fast Hadamard transform or an inverse Hadamard transform performed on said in-phase component and quadrature component;
means for computing the sum of the squares of the respective correlation values of said in-phase component and quadrature component;
means for selecting either said fast Hadamard transform or inverse Hadamard transform output, which outputs the maximum value of said computed sum of the squares;
means for carrying out coherent detection by complex multiplication of said selected fast Hadamard transform or inverse Hadamard transform output, and the in-phase component and quadrature component determined by said de-spreading;
means for determining the correlation value by performing either a fast Hadamard transform or an inverse Hadamard transform on said coherent detection output; and
means for converting to a data signal a Hadamard matrix corresponding to the maximum value of said determined correlation value.

10. A base station, which utilizes a radio communication system that uses a code division multiple access system, which performs orthogonal M-ary modulation on a data signal, followed by spread modulation, said base station, comprising:
a plurality of receiving branches and fingers, each of said plurality of receiving branches and fingers including:
means for determining an in-phase component and a quadrature component by de-spreading a received signal sent from a terminal;
means for determining correlation values of said in-phase component and quadrature component, which correspond to respective Hadamard matrices resulting from either a fast Hadamard transform or an inverse Hadamard transform performed on said in-phase component and quadrature component;
means for computing the sum of the squares of the respective correlation values of said in-phase component and quadrature component;
means for selecting either said fast Hadamard transform or inverse Hadamard transform output, which outputs the maximum value of said computed sum of the squares;
means for carrying out coherent detection by complex multiplication of said selected fast Hadamard transform or inverse Hadamard transform output, and the in-phase component and quadrature component determined via said de-spreading;
means for determining the correlation value by performing either a fast Hadamard transform or an inverse Hadamard transform on said coherent detection output;
means for converting to a data signal a Hadamard matrix corresponding to the maximum value of said determined correlation value;
means for combining said determined correlation value with correlation values from other branches and fingers; and
means for converting to a data signal a Hadamard matrix corresponding to the maximum value of the combined correlation values of said plurality of receiving branches and fingers.

11. The orthogonal M-ary modulation-utilizing radio communication system according to claim 10, further comprising:
means for combining the output of means for computing said sum of squares for said plurality of receiving branches and fingers, wherein the means for selecting either said fast Hadamard transform or inverse Hadamard transform output, selects the fast Hadamard transform or inverse Hadamard transform output, which has the combined output of said combining means as the maximum value.

* * * * *